US012738022B2

(12) United States Patent
Zhao et al.

(10) Patent No.: US 12,738,022 B2
(45) Date of Patent: Sep. 15, 2026

(54) METHOD, APPARATUS, READABLE MEDIUM AND ELECTRONIC DEVICE OF KEY-VALUE MATCHING

(71) Applicant: Beijing Youzhuju Network Technology Co., Ltd., Beijing (CN)

(72) Inventors: Tianyu Zhao, Beijing (CN); Lulu Chen, Beijing (CN); Can Huang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 182 days.

(21) Appl. No.: 18/714,402

(22) PCT Filed: Nov. 1, 2022

(86) PCT No.: PCT/CN2022/129025

§ 371 (c)(1),
(2) Date: May 29, 2024

(87) PCT Pub. No.: WO2023/103653

PCT Pub. Date: Jun. 15, 2023

(65) Prior Publication Data

US 2025/0029362 A1 Jan. 23, 2025

(30) Foreign Application Priority Data

Dec. 8, 2021 (CN) .......................... 202111494112.3

(51) Int. Cl.

| | |
|---|---|
| ***G06V 10/74*** | (2022.01) |
| ***G06F 18/22*** | (2023.01) |
| ***G06T 3/40*** | (2006.01) |
| ***G06T 7/12*** | (2017.01) |
| ***G06V 10/44*** | (2022.01) |
| ***G06V 10/771*** | (2022.01) |

(52) U.S. Cl.
CPC .............. *G06V 10/761* (2022.01); *G06T 3/40* (2013.01); *G06T 7/12* (2017.01); *G06V 10/44* (2022.01); *G06V 10/771* (2022.01)

(58) Field of Classification Search
CPC .... G06V 10/761; G06V 10/44; G06V 10/771; G06V 10/82; G06F 16/332; G06F 18/22; G06F 18/00; G06T 3/40; G06T 7/12
See application file for complete search history.

(56) References Cited

U.S. PATENT DOCUMENTS

| | | | | |
|---|---|---|---|---|
| 2005/0195221 | A1 | 9/2005 | Berger et al. | |
| 2009/0245512 | A1 | 10/2009 | Masui et al. | |
| 2021/0271870 | A1* | 9/2021 | Ni | G06N 3/096 |

FOREIGN PATENT DOCUMENTS

| | | | | |
|---|---|---|---|---|
| CN | 107832456 A | * 3/2018 | | G06F 18/22 |
| CN | 111967467 A | 11/2020 | | |

(Continued)

OTHER PUBLICATIONS

Office action received from Chinese patent application No. 202111494112.3 mailed on Dec. 19, 2024, 10 pages (4 pages English Translation and 6 pages Original Copy).

(Continued)

*Primary Examiner* — John Villecco
*Assistant Examiner* — Kyla Guan-Ping Tiao Allen

(57) ABSTRACT

A method, apparatus, readable medium and electronic device of key-value matching, the method inputs the image to be detected into a predetermined key-value matching model, to cause the predetermined key-value matching model to output a matching relationship between the attribute data and the attribute value data, in this way, it can not only provide an end-to-end network model for key-value matching, effectively improve the efficiency of key-value matching, but also obtain the target attribute value data region and the target attribute data region of higher accuracy by the semantic segmentation submodel in the predetermined key-value matching model, and then determine the matching relationship between the attribute data and the attribute value data in the image to be detected based on the (Continued)

target attribute data region and the target attribute value data region by the image matching submodel, thereby effectively improving the accuracy of the key-value matching result.

20 Claims, 3 Drawing Sheets

(56) References Cited

FOREIGN PATENT DOCUMENTS

| | | | |
|---|---|---|---|
| CN | 112396055 | A | 2/2021 |
| CN | 112434555 | A | 3/2021 |
| CN | 112949476 | A | 6/2021 |
| CN | 113239807 | A | 8/2021 |
| CN | 113590857 | A | 11/2021 |
| CN | 114153959 | A | 3/2022 |
| WO | 2017/157198 | A1 | 9/2017 |
| WO | 2021/146937 | A1 | 7/2021 |

OTHER PUBLICATIONS

Ying et al., "Key technologies for Image Retrieval Technique Based on Big data", Electronic Technology & Software Engineering, pp. 1-3.

Office action received from Chinese patent application No. 202111494112.3 mailed on Apr. 28, 2025, 6 pages (2 pages English Translation and 4 pages Original Copy).

* cited by examiner

REGION A

REGION B

REGION C REGION D

METHOD, APPARATUS, READABLE MEDIUM AND ELECTRONIC DEVICE OF KEY-VALUE MATCHING

CROSS-REFERENCE

The present application claims priority to Chinese Patent Application No. 202111494112.3, filed on Dec. 8, 2021 and entitled "METHOD, APPARATUS, READABLE MEDIUM AND ELECTRONIC DEVICE OF KEY-VALUE MATCHING", the entirety of which is incorporated herein by reference

FIELD

The present disclosure relates to the field of image processing, and in particular, to method, apparatus, readable medium and electronic device of key-value matching.

BACKGROUND

Key-value matching in document images refers to a process of pairing and extracting texts that constitute a key-value relationship in the document images. For example, in a business license image, a name and a certain company constitute a key-value relationship; in an identification card image, a name and a certain person (such as Zhang San) constitute a key-value relationship; and in a graduation certificate image, a school and a certain university constitute a key-value relationship, so that key-value matching is to recognize and extract a key-value pair that constitutes such a key-value relationship.

Most current key-value matching methods rely on position information about Keys (attribute data) and Values (attribute value data) in the key-value pairs, and then, searching and matching are performed in combination with character recognition results based on position relationships between the key-value pairs. However, position detection of the key-value pairs in the related art usually has the problem of lower accuracy of detection results. As a result, with the position information about the Keys and the Values obtained by the existing position detection methods, the accuracy of key-value matching results cannot be guaranteed.

SUMMARY

This Summary section is provided to introduce the concepts in a simplified form that are described in detail in the section of Detailed Description. This Summary section is not intended to define key features or essential features of the claimed technical solutions, nor is it intended to be used to limit the scope of the claimed technical solutions.

The present disclosure provides a method, apparatus, readable medium and electronic device of key-value matching.

In a first aspect of the present disclosure, a method of key-value matching is provided, the method comprises:

Obtaining an image to be detected, the image to be detected comprising at least one attribute data and at least one attribute value data;

Inputting the image to be detected into a predetermined key-value matching model, to cause the predetermined key-value matching model to output a matching relationship between the attribute data and the attribute value data;

Wherein the predetermined key-value matching model comprises a semantic segmentation submodel and an image matching submodel coupled with the semantic segmentation submodel;

The semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region;

The image matching submodel is configured to determine the matching relationship between the attribute data and the attribute value data in the image to be detected based on the target attribute data region and the target attribute value data region.

In a second aspect of the present disclosure, an apparatus of key-value matching is provided, the apparatus comprises:

An obtaining module configured to obtain an image to be detected, the image to be detected comprising comprises at least one attribute data and at least one attribute value data;

A determination module configured to input the image to be detected into a predetermined key-value matching model, to cause the predetermined key-value matching model to output a matching relationship between the attribute data and the attribute value data;

Wherein the predetermined key-value matching model comprises a semantic segmentation submodel and an image matching submodel coupled with the semantic segmentation submodel;

The semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region;

The image matching submodel is configured to determine the matching relationship between the attribute data and the attribute value data in the image to be detected based on the target attribute data region and the target attribute value data region.

In a third aspect of the present disclosure, a computer-readable medium having a computer program stored thereon is provided, when executed by a processing apparatus, implementing the steps of the method of the foregoing first aspect.

In a fourth aspect of the present disclosure, an electronic device is provided, comprising:

A storage apparatus having a computer program stored thereon;

A processing apparatus for executing the computer program in the storage apparatus to implement the steps of the method of the foregoing first aspect.

With the above technical solutions, the image to be detected is input into the predetermined key-value matching model, so as to enable the predetermined key-value matching model to output the matching relationship between the attribute data and the attribute value data. In this way, it can not only provide an end-to-end network model for key-value matching, that is, a key-value matching relationship in the image to be detected may be obtained directly by the predetermined key-value matching model, thereby effectively improving the efficiency of key-value matching. The target attribute value data region and the target attribute data region of higher accuracy can also be obtained by the semantic segmentation submodel in the predetermined key-value matching model; and then, based on the target attribute data region and the target attribute value data region, the matching relationship between the attribute data and the attribute value data in the image to be detected is determined by the image matching submodel, so that the accuracy of key-value matching results can be improved effectively.

Other features and advantages of the present disclosure will be described in detail in the section of Detailed Description.

BRIEF DESCRIPTION OF THE DRAWINGS

The above and other features, advantages and aspects of various embodiments of the present disclosure will become more apparent with reference to the following detailed description in conjunction with the accompanying drawings. Throughout the accompanying drawings, the same or similar reference symbols refer to the same or similar elements. It should be understood that the accompanying drawings are schematic and that elements are not necessarily drawn to scale.

DETAILED DESCRIPTION

Figure 1:
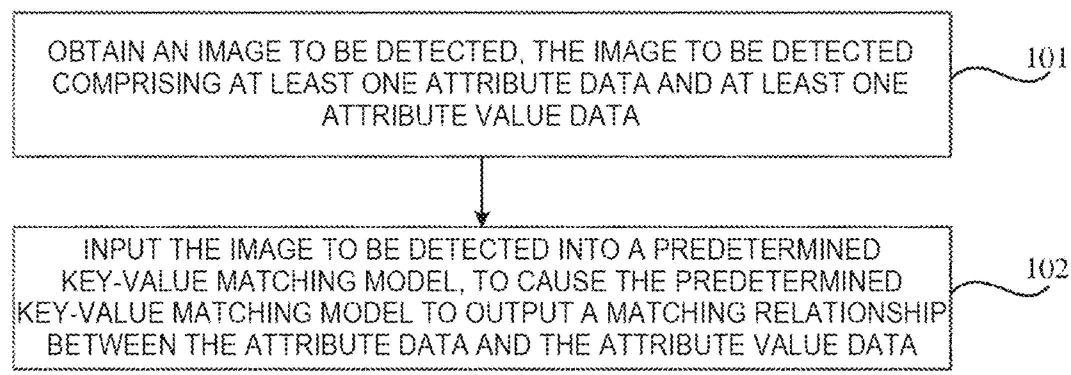
FIG. 1 is a flow chart of the method of key-value matching shown by one exemplary embodiments of the present disclosure.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

It would be appreciated that the steps described in the method embodiments of the present disclosure may be executed by pressing and/or in parallel. In addition, the method embodiments may include additional steps and/or omit the execution of the shown steps. The scope of the present disclosure is not limited in this regard.

As used herein, term “including” and similar terms would be appreciated as open inclusion, that is, “including but not limited to”. The term “based on” would be appreciated as “at least partially based on”. The term “one embodiment” or “the embodiment” would be appreciated as “at least one embodiment”. The term “some embodiments” would be appreciated as “at least some embodiments”. Other explicit and implicit definitions will be provided in the following.

It needs to be noted that concepts such as “first”. “second”, and the like mentioned in the present disclosure are only used to distinguish different apparatuses, modules or units, and are not used to limit the order or interdependence relationship of functions performed by these apparatuses, modules or units.

It needs to be noted that terms “one”. “more” mentioned in the present disclosure are illustrative and not restrictive, and one skilled in the art should understand that this term should be understood as “one or more” unless the context clearly indicates otherwise.

The names of massages or information interacted among multiple apparatuses in the embodiments of the present disclosure are only for illustrative purpose, but not used to limit the scope of these messages or the information.

Before introducing specific implementations of the present disclosure in detail, application scenarios of the disclosure are first illustrated as follows. The present disclosure may be applied to a process of recognizing and extracting a key-value pair in a document image, wherein the document image may be an image of certificate, such as a business license image, a degree certificate image, a graduation certificate image, and an identification card image. The key-value pair refers to a set of texts with a key-value relationship. For example, in the business license image, a name and a certain company constitute a key-value relationship and belong to a key-value pair; in the identification card image, a name and Zhang San constitute a key-value relationship and belong to a key-value pair; and in the graduation certificate image, a school and a certain university constitute a key-value relationship and belong to a key-value pair.

In the related art, the method of key-value matching typically needs to firstly detect positions of attribute data and attribute value data by a position detection model, and then make searching and matching based on the positions of the attribute data and the attribute value data as well as results of character recognition in combination with a predetermined relational dictionary. However, since a phenomenon of adhesion between different lines often exists in the document images, and the position detection model in the related art typically fails to accurately recognize the positions of the attribute data and the positions of the attribute value data in the document images having the phenomenon of adhesion when recognizing the positions of the attribute data and the positions of the attribute value data, to make a subsequent searching and matching process with the positions of poor accuracy, which will undoubtedly lead to poor accuracy of matching results. In addition, in the related art, there is no end-to-end network model suitable for a key-value matching process, and typically achieve key-value matching by two or more combined models, so that it is not only disadvantageous to reducing the amount of calculation required in the key-value matching process, but also disadvantageous to improving the efficiency of key-value matching.

In order to solve the above technical problems, the present disclosure provides a method, apparatus, readable medium and electronic device of key-value matching. The method inputs the image to be detected into a predetermined key-value matching model, so that the predetermined key-value matching model outputs the matching relationship between the attribute data and the attribute value data. In this way, it not only provides an end-to-end network model for key-value matching, that is, directly obtains the key-value matching relationship in the image to be detected by the predetermined key-value matching model, so that effectively improves the efficiency of key-value matching, and can also obtain the target attribute value data region and target attribute data region with higher accuracy by the semantic segmentation submodel in the predetermined key-value matching model, and then determine the matching relationship between the attribute data and the attribute value data in the image to be detected based on the target attribute data region and the target attribute value data region by the image matching submodel, thereby effectively improving the accuracy of the key-value matching result.

The technical solutions of the present disclosure are described below in detail in conjunction with specific embodiments.

FIG. 1 is a flow chart of a method of key-value matching shown by one exemplary embodiment of the present disclosure. As shown in FIG. 1, the method may include the following steps:

In step 101, obtain an image to be detected, the image to be detected comprising at least one attribute data and at least one attribute value data.

Where, the image to be detected may be an image of certificate, such as a business license image, a degree certificate image, a graduation certificate image, and an identification card image. The attribute data is data corresponding to a Key in a key-value pair, the attribute value data is data corresponding to a Value in the key-value pair, and the Key and the Value form the key-value pair.

In step 102, input the image to be detected into a predetermined key-value matching model, to cause the predetermined key-value matching model to output a matching relationship between the attribute data and the attribute value data.

Where, the predetermined key-value matching model includes a semantic segmentation submodel and an image matching submodel coupled with the semantic segmentation submodel.

The semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region.

The image matching submodel is configured to determine the matching relationship between the attribute data and the attribute value data in the image to be detected based on the target attribute data region and the target attribute value data region.

Figure 2:
FIG. 2 is a schematic diagram of a text related region shown by one exemplary embodiments of the present disclosure.
Figure 2:

It should be explained that the text coverage region may be the smallest region that can cover a text, and the text center region may be a region having the same aspect ratio between a center of the text and the text and located in the text coverage region. The attribute data region is a region where the attribute data is located, and the attribute value data region is a region where the attribute value data is located. As shown in FIG. 2, it is a schematic diagram of a text-related region shown by one exemplary embodiment of the present disclosure. In FIG. 2, for a key-value pair text (a company name: ABC Co., LTD.), region a is the text coverage region of the text, region b is the text center region of the text, region c is the attribute data region, and region d is the attribute value data region.

With the above technical solution, the image to be detected is input into the predetermined key-value matching model, so as to enable the predetermined key-value matching model to output the matching relationship between the attribute data and the attribute value data. In this way, not only can an end-to-end network model be provided for key-value matching, that is, a key-value matching relationship in the image to be detected may be obtained directly by the predetermined key-value matching model, thereby effectively improving the efficiency of key-value matching. The target attribute value data region and the target attribute data region of higher accuracy can also be obtained by the semantic segmentation submodel in the predetermined key-value matching model; and then, the matching relationship between the attribute data and the attribute value data in the image to be detected is determined by the image matching submodel based on the target attribute data region and the target attribute value data region, so that the accuracy of key-value matching results can be improved effectively.

Optionally, the semantic segmentation submodel determines the target attribute data region based on the text coverage region, the text center region and the attribute data region, and determines the target attribute value data region based on the text coverage region, the text center region and the attribute value data region. The corresponding specific implementations may be:

Scale up the text center region proportionally by a predetermined factor to obtain a scaled-up target text center region, obtain a first intersection region of the target text center region and the text coverage region, and obtain a second intersection region of the first intersection region and the attribute data region, use the second intersection region as the target attribute data region, and obtain a third intersection region of the first intersection region and the attribute value data region, use the third intersection region as the target attribute value data region. With the above technical solution, the target attribute data region and the target attribute value data region of higher accuracy and reliability can be obtained based on the text coverage region, the text center region, the attribute data region and the attribute value data region in the image to be detected, so that a reliable data basis can be provided for subsequent determination of the matching relationship, and thus, the accuracy of key-value matching results can be improved effectively.

Optionally, the image matching submodel is configured to: Establish a first relationship graph based on the target attribute data region, establish a second relationship graph based on the target attribute value data region, and determine a matching relationship between the attribute data and the attribute value data in the image to be detected based on the first relationship graph and the second relationship graph.

Herein, the first relationship graph comprises attribute nodes each corresponding to a target attribute data region and first connecting lines between the different attribute nodes, and the second relationship graph comprises attribute value nodes each corresponding to a target attribute value data region and second connecting lines between the different attribute value nodes.

It should be explained that when the first relationship graph is established based on the target attribute data region, first position information about the attribute data may be determined firstly based on the target attribute data region, and then the first relationship graph is generated by a Delaunay triangulation method of graph construction based on the first position information about the at least one piece of attribute data. When the second relationship graph is established based on the target attribute value data region, second position information about the attribute value data may be determined firstly based on the target attribute value data region, and then, the second relationship graph is generated by a fully connected method of graph construction based on the second position information about the at least one piece of attribute value data. Both the Delaunay triangulation method of graph construction (Delaunay triangulation,Delaunay triangulation algorithm) and the fully connected method of graph construction (namely, construction of a fully connected network topology) are common methods of graph construction in the prior art, which will not be repeated in the present disclosure here.

Where, implementations of determining the first position information based on the target attribute data region and the second position information based on the target attribute value data region may include the following three kinds:

In a first implementation, the position of the target attribute data region may be used as the first position information, and the position of the target attribute value data region may be used as the second position information.

In a second implementation, the central position of the target attribute data region may be used as the first position information, and the central position of the target attribute value data region may be used as the second position information.

In a third implementation, any point within the target attribute data region may be used as the first position information, and any point within the target attribute value data region may be used as the second position information.

It should be also pointed that implementations of determining the matching relationship between the attribute data and the attribute value data in the image to be detected based on the first relationship graph and the second relationship graph as described above may include: extracting a first feature corresponding to each of the attribute nodes and a second feature corresponding to each of the first connecting lines in the first relationship graph, extracting a third feature corresponding to each of the attribute value nodes and a fourth feature corresponding to each of the second connecting lines in the second relationship graph, and determining the matching relationship between the attribute data and the attribute value data based on the first feature corresponding to each of the attribute nodes and the second feature corresponding to each of the first connecting lines as well as the third feature corresponding to each of the attribute value nodes and the fourth feature corresponding to each of the second connecting lines.

In addition, determining the matching relationship between the attribute data and the attribute value data based on the first feature corresponding to each of the attribute nodes and the second feature corresponding to each of the first connecting lines as well as the third feature corresponding to each of the attribute value nodes and the fourth feature corresponding to each of the second connecting lines as described above may be performed by the following steps shown in S11-S13.

In step S11, a node similarity matrix is determined based on the first feature corresponding to each of the attribute nodes and the third feature corresponding to each of the attribute value nodes.

In this step, in the case where the first feature corresponding to the attribute node is $P_1$, and the third feature corresponding to the attribute value node is $P_2$, the node similarity matrix $M_P$ may be obtained by $M_P=P_1P_2$.

In step S12, a connecting line similarity matrix is determined based on the second feature corresponding to each of the first connecting lines and the fourth feature corresponding to each of the second connecting lines.

In this step, in the case where the first feature corresponding to the attribute node is $P_1$, the third feature corresponding to the attribute value node is $P_2$, the second feature corresponding to the first connecting line is $E_1$, and the fourth feature corresponding to the second connection is $E_2$, the connecting line similarity matrix M, may be determined by the following equation:

$$M_e = [E_1 G_1 | E_1 H_1] \wedge [E_2 G_2 | E_2 H_2]^T.$$

In the above equation, A may be a symmetric parameter matrix. For example, it may be a 2×2 symmetric parameter matrix.

In step S13, the matching relationship between each of the attribute data and each of the attribute value data is determined based on the node similarity matrix and the connecting line similarity matrix.

In this step, a target relationship matrix M may be determined based on the node similarity matrix $M_P$ and the connecting line similarity matrix $M_e$ by the following equation:

$$M = [vec(M_P)] + (G_2 \otimes G_1)[vec(M_e)](H_2 \otimes H_1)^T.$$

In the above equation, vec(x) represents an expansion of x by a row, [x] represents a diagonal matrix of x, and ⊗ is a Kronecker product.

After obtaining the target relationship matrix M, a feature vector V corresponding to the target relationship matrix M may be obtained, and the matching relationship between each of the attribute data and each attribute value data is determined based on the feature vector V.

Optionally, in this step, double randomization may be further performed on the feature vector V to obtain a double random matrix S, and the matching relationship between each attribute data and each attribute value data is determined based on the double random matrix S. The process of performing double randomization belongs to the prior art, and the process of performing double randomization on the feature vector V may refer to implementations in the prior art and will not be repeated in the present disclosure here.

Exemplarily, if 3 attribute data (Key1. Key2, and Key3 respectively) and 3 attribute value data (Value1, Value2, and Value3 respectively) are included in the image to be detected, and the double random matrix S obtained is:

$$\begin{bmatrix} 1 & 0 & 0 \\ 0 & 0 & 1 \\ 0 & 1 & 0 \end{bmatrix},$$

where rows of the matrix represent Key 1. Key2, and Key3, and columns of the matrix represent Value1, Value2, and Value3, it represents that Key1 matches Value1, Key 2 matches Value3, and Key3 matches Value2.

With the above technical solution, the first relationship graph may be established based on at least one target attribute data region in the image to be detected, the second relationship graph may be established based on at least one target attribute value data region in the image to be detected, and the matching relationship between the attribute data and the attribute value data in the image to be detected may be determined based on the first relationship graph and the second relationship graph, so that the accuracy of key-value matching results can be improved effectively.

Figure 3:
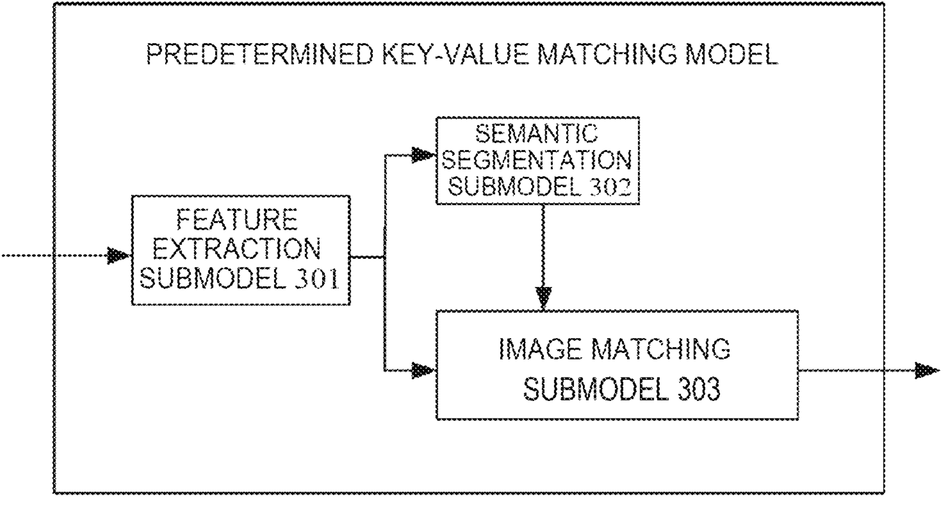
FIG. 3 is a block diagram of a predetermined key-value matching model shown by one exemplary embodiments of the present disclosure.

FIG. 3 is a block diagram of a predetermined key-value matching model shown by one exemplary embodiment of the present disclosure. As shown in FIG. 3, the predetermined key-value matching model includes a feature extraction submodel 301, which is coupled with a semantic segmentation submodel 302 and a image matching submodel 303.

The feature extraction submodel 301 is configured to obtain a first feature map corresponding to the image to be detected through down sampling, and input the first feature map into the semantic segmentation submodel, to cause the semantic segmentation submodel 302 to determine, based on the first feature map, the text coverage region, the text center region, the attribute data region, and the attribute value data region in the image to be detected.

The feature extraction submodel 301 is further configured to obtain a second feature map and a third feature map corresponding to the image to be detected, and input the second feature map and the third feature map into the graph matching submodel, to cause the image matching submodel 303 to determine a matching relationship between the attribute data and the 30) attribute value data in the image to be detected based on the second feature map, the third feature map, the first relationship graph, and the second relationship graph, wherein a network depth corresponding to the second feature map is shallower than a network depth corresponding to the third feature map.

Optionally, the image matching submodel is configured to:

Extract, from the second feature map, a first feature corresponding to each of the attribute nodes in the first relationship graph; extract, from the third feature map, a second feature corresponding to each of the first connecting lines; extract, from the second feature map, a third feature corresponding to each of the attribute values node in the second relationship graph; and extract, from the third feature map, a fourth feature corresponding to each of the second connecting lines; and determine a matching relationship between the attribute data and the attribute value data based on the first feature corresponding to each of the attribute nodes, the second feature corresponding to each of the first connecting lines, the third feature corresponding to each of the attribute value nodes, and the fourth feature corresponding to each of the second connecting lines.

It should be explained that firstly, the first features and the third features are obtained by a shallow network, and the second features and the fourth features are obtained by a deep network, so that image features corresponding to the attribute nodes, the attribute value nodes, the first connecting lines and the second connecting lines can be obtained effectively. Secondly, since the depth of network is shallower and it is closer to an input, it contains more feature details and the description of extracted features to the nodes (the attribute nodes or the attribute value nodes) is more accurate, thereby, the accuracy of the extracted first features of the mentioned attribute nodes and the third features of the attribute values node can be effectively guaranteed, which is beneficial to providing a reliable data basis for key-value matching; Extracting features of an edge (namely, the first connecting lines and the second connecting lines) by the deep network can effectively reduce data processing capacity and improve model processing efficiency.

With the above technical solution, the feature extraction submodel 301 can be enabled to provide feature data for the semantic segmentation submodel 302 and the image matching submodel 303 simultaneously, thereby the structure of the model can be effectively simplified, the volume of the model itself can be reduced, and the model processing efficiency can be improved.

Figure 4:
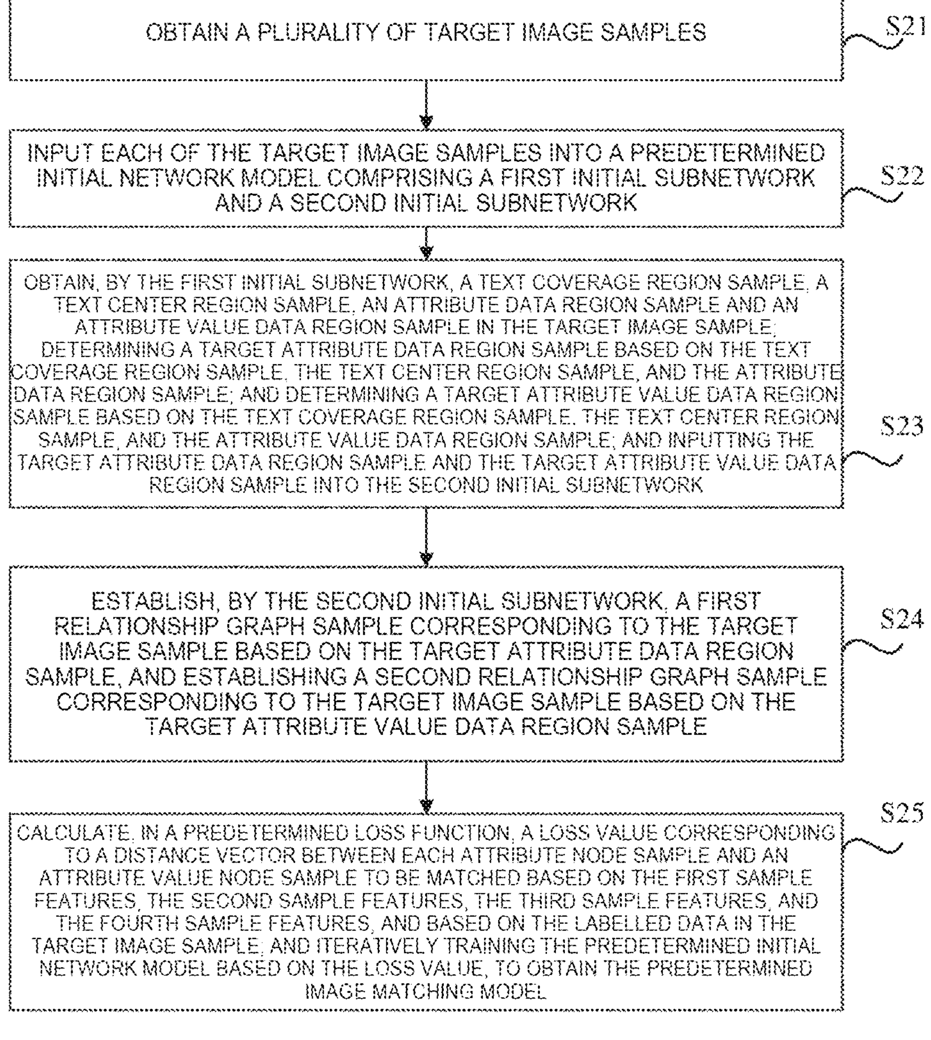
FIG. 4 is a training flow chart of a predetermined key-value matching model shown by one exemplary embodiments of the present disclosure.

FIG. 4 is a training flow chart of a predetermined key-value matching model shown by one exemplary embodiment of the present disclosure. As shown in FIG. 4, the predetermined key-value matching model is obtained by training in the following steps:

In step S21, obtain a plurality of target image samples.

Where the target image samples comprises labelled data of a text coverage region, labelled data of a text center region, labelled data of an attribute data region, labelled data of an attribute value data region, and labelled data of a matching relationship between attribute data and attribute value data.

In step S22, input each of the target image samples into a predetermined initial network model comprising a first initial subnetwork and a second initial subnetwork.

Optionally, the predetermined initial network may further comprise a third initial subnetwork, the third initial subnetwork is coupled with the first initial subnetwork and the second initial subnetwork, and the third initial subnetwork is configured to obtain a first sample feature map, a second sample feature map, and a third sample feature map corresponding to the target image sample, wherein a network depth corresponding to the second sample feature map is shallower than a network depth corresponding to the third sample feature map; and input the first sample feature map into the first initial subnetwork and input the second sample feature map and the third sample feature map into the second initial subnetwork.

In step S23, obtain, by the first initial subnetwork, a text coverage region sample, a text center region sample, an attribute data region sample and an attribute value data region sample in the target image sample; determining a target attribute data region sample based on the text coverage region sample, the text center region sample, and the attribute data region sample; and determining a target attribute value data region sample based on the text coverage region sample, the text center region sample, and the attribute value data region sample; and inputting the target attribute data region sample and the target attribute value data region sample into the second initial subnetwork.

In this step, the text center region sample may be scaled up proportionally according to a predetermined factor to obtain a scaled up target text center region sample; a first intersection sample region between the target text center region sample and the text coverage region sample as well as a second intersection sample region between the first intersection sample region and the attribute data region sample are obtained; the second intersection sample region is used as the target attribute data region sample; and a third intersection sample region between the first intersection sample region and the attribute value data region sample is obtained, and is used as the target attribute value data region.

In step S24, establish, by the second initial subnetwork, a first relationship graph sample corresponding to the target image sample based on the target attribute data region sample, and establishing a second relationship graph sample corresponding to the target image sample based on the target attribute value data region sample.

Wherein the first relationship graph sample comprises attribute node samples each corresponding to a target attribute data region sample and first connecting line samples between the different attribute node samples, the second relationship graph sample comprises attribute value node samples each corresponding to a target attribute value data region sample and second connecting lines sample between the different attribute value node samples; and obtain first sample features corresponding to the attribute node samples, second sample features corresponding to the first connecting line samples, third sample features corresponding to the attribute value node samples, and fourth sample features corresponding to the second connecting line sample.

Obtaining first sample features corresponding to the attribute node samples, second sample features corresponding to the first connecting line samples, third sample features corresponding to the attribute value node samples and fourth sample features corresponding to the second connecting line samples as described above, the corresponding implementations can be:

Extracting, by the second initial subnetwork, a first sample feature corresponding to each of the attribute node samples in the first relationship graph sample and a third sample feature corresponding to each of the attribute value node samples in the second relationship graph sample from a second sample feature map based on the target image sample; and extracting second sample features corresponding to the first connecting line samples and fourth sample features corresponding to the second connecting line samples from the third sample feature map corresponding to the target image sample.

In step S25, calculate, in a predetermined loss function, a loss value corresponding to a distance vector between each attribute node sample and an attribute value node sample to be matched based on the first sample features, the second sample features, the third sample features, and the fourth sample features, and based on the labelled data in the target image sample; and iteratively training the predetermined initial network model based on the loss value, to obtain the predetermined image matching model.

In this step, a node similarity matrix may be determined based on the first sample feature of each of the attribute node samples and the third sample feature corresponding to each of the attribute value node samples, and a connecting line similarity matrix may be determined based on the second sample feature corresponding to each of the first connecting line samples and the fourth sample feature corresponding to each of the second connecting line samples; a target relationship matrix is generated based on the node similarity matrix and the connecting line similarity matrix; a double random matrix corresponding to the target relationship matrix is obtained; the vector of distance between each attribute node sample and the attribute value node sample to be matched is determined based on the double random matrix; and the loss value is determined by the predetermined loss function based on the vector of distance.

Exemplarily, the first relationship graph sample may be represented by a first adjacency matrix A1, and the second relationship graph sample may be represented by a second adjacency matrix A2. It is determined by the equation $A=GH^T$ that incidence matrices corresponding to the first adjacency matrix A1 are $G_1$ and $H_1$, respectively, and incidence matrices corresponding to the second adjacency matrix A2 are $G_2$ and $H_2$, respectively. In the case where the first sample feature, the second sample feature, the third sample feature and the fourth sample feature that are determined in step S24 are $P_1$, $E_1$, $P_2$ and $E_2$, respectively, a node similarity matrix $M_P$ may be obtained by $M_P=P_1P_2$, and a connecting line similarity matrix $M_e$ may be determined by equation 1 as follows:

$$M_e = [E_1G_1|E_1H_1] \Lambda [E_2G_2|E_2H_2]^T \quad \text{Equation 1}$$

In the equation 1 above, Λ may be a symmetric parameter matrix.

Then, a target relationship matrix M may be determined based on the node similarity matrix $M_P$ and the connecting line similarity matrix $M_e$ by equation 2 as follows:

$$M = [vec(M_P)] + (G_2 \otimes G_1)[vec(M_e)](H_2 \otimes H_1)^T \quad \text{Equation 2}$$

In the equation 2 above, vec(x) represents an expansion of x by a row, [x] represents a diagonal matrix of x, and ⊗ is a Kronecker product.

Further, a feature vector V corresponding to the target relationship matrix M may be obtained, and then double randomization is performed on the feature vector to obtain a double random matrix S corresponding to the feature vector V, so that the vector of distance between the attribute node sample and each attribute value node sample is determined based on the double random matrix by equation 3 as follows:

$$d_i = \frac{\exp[\alpha S(i, 1 \ldots m)]}{\sum_j \exp[\alpha S(i, j)]} P - P_i \quad \text{Equation 3}$$

In the equation 3 above, α is a predetermined coefficient, for example, it may be 200; S is a double random matrix; i represents a row number of the double random matrix S; j represents a column number of the double random matrix S; S (i,1 . . . m) represents the $i^{th}$ row of the double random matrix S; the double random matrix S has m rows in total; P is a set of positions of the attribute value nodes; $P_i$ is the position of the $i^{th}$ attribute node; and $$\frac{\exp[\alpha S(i, 1 \ldots m)]}{\sum_j \exp[\alpha S(i, j)]} = \mathrm{softmax}(\alpha S(i, 1 \ldots m))$$

represents the weight of features of the $i^{th}$ attribute value node relative to the set P of positions of the attribute value nodes.

Then, a loss value corresponding to the vector of distance between each attribute node sample and the attribute value node sample to be matched may be calculated by a predetermined loss function L(d) below; wherein the predetermined loss function is as follows:

$$L(d) = \sum_i \phi(d_i - d_i^{gt}).$$

In the above loss function, $$\phi(x) = \sqrt{x^T x + \in}, d_i^{gt}$$

is a target vector of distance obtained by calculation based on an labelled attribute data region and the corresponding attribute value data region, and ε is a random small number.

During training, the loss value corresponding to the vector of distance between each attribute node sample and the attribute value node sample to be matched may be obtained. In the case where the loss value is less than or equal to a predetermined loss value threshold, it is determined that model training is ended to obtain an optimal predetermined key-value matching model.

By the above training methods, an end-to-end predetermined key-value matching model can be trained for key-value matching. The predetermined key-value matching model has stronger generalization and can be applied to a variety of different key-value matching scenarios. For example, it can be applied to key-value matching in not only identification card images, but also a plurality of scenarios such as business license images and degree certificate images.

Figure 5:
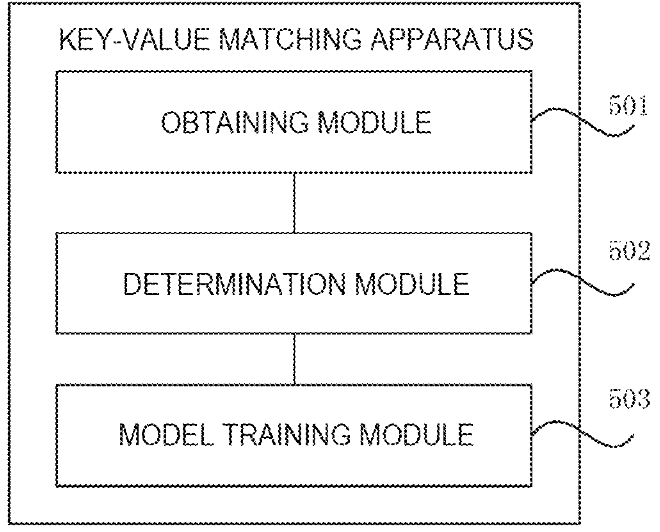
FIG. 5 is a block diagram of an apparatus of key-value matching shown by one exemplary embodiments of the present disclosure.

FIG. 5 is a block diagram of a key-value matching apparatus according to an exemplary embodiment of the present disclosure. As shown in FIG. 5, the apparatus may include:

An obtaining module 501 configured to obtain an image to be detected, the image to be detected comprising comprises at least one attribute data and at least one attribute value data; and A determination module 502 configured to input the image to be detected into a predetermined key-value matching model, to cause the predetermined key-value matching model to output a matching relationship between the attribute data and the attribute value data.

Wherein the predetermined key-value matching model comprises a semantic segmentation submodel and an image matching submodel coupled with the semantic segmentation submodel.

The semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region.

The image matching submodel is configured to determine the matching relationship between the attribute data and the attribute value data in the image to be detected based on the target attribute data region and the target attribute value data region.

With the above technical solution, input the image to be detected into the predetermined key-value matching model, to cause the predetermined key-value matching model to output the matching relationship between the attribute data and the attribute value data. In this way, an end-to-end network model is not only provided for key-value matching, effectively improving the efficiency of key-value matching, the target attribute value data region and the target attribute data region of higher accuracy can also be obtained by the semantic segmentation submodel in the predetermined key-value matching model, and then the matching relationship between the attribute data and the attribute value data in the image to be detected is determined by the image matching submodel based on the target attribute data region and the target attribute value data region, so that the accuracy of key-value matching results can be improved effectively.

Optionally, the semantic segmentation submodel is configured to: Scale up the text center region proportionally by a predetermined factor to obtain a scaled-up target text center region, obtain a first intersection region of the target text center region and the text coverage region, and obtain a second intersection region of the first intersection region and the attribute data region, use the second intersection region as the target attribute data region, and obtain a third intersection region of the first intersection region and the attribute value data region, use the third intersection region as the target attribute value data region.

Optionally, the image matching submodel is configured to: Establish a first relationship graph based on the target attribute data region, establish a second relationship graph based on the target attribute value data region, and determine a matching relationship between the attribute data and the attribute value data in the image to be detected based on the first relationship graph and the second relationship graph.

Wherein the first relationship graph comprises attribute nodes each corresponding to a target attribute data region and first connecting lines between the different attribute nodes, and the second relationship graph comprises attribute value nodes each corresponding to a target attribute value data region and second connecting lines between the different attribute value nodes.

Optionally, the predetermined key-value matching model further comprises a feature extraction submodel coupled with the semantic segmentation submodel and the graph matching submodel, respectively.

The feature extraction submodel is configured to obtain a first feature map corresponding to the image to be detected through down sampling, and input the first feature map into the semantic segmentation submodel, to cause the semantic segmentation submodel to determine, based on the first feature map, the text coverage region, the text center region, the attribute data region, and the attribute value data region in the image to be detected.

The feature extraction submodel is further configured to obtain a second feature map and a third feature map corresponding to the image to be detected, and input the second feature map and the third feature map into the graph matching submodel, to cause the image matching submodel to determine a matching relationship between the attribute data and the attribute value data in the image to be detected based on the second feature map, the third feature map, the first relationship graph, and the second relationship graph, wherein a network depth corresponding to the second feature map is shallower than a network depth corresponding to the third feature map.

Optionally, the image matching submodel is configured to: Extract, from the second feature map, a first feature corresponding to each of the attribute nodes in the first relationship graph; extract, from the third feature map, a second feature corresponding to each of the first connecting lines; extract, from the second feature map, a third feature corresponding to each of the attribute values node in the second relationship graph; and extract, from the third feature map, a fourth feature corresponding to each of the second connecting lines; and determine a matching relationship between the attribute data and the attribute value data based on the first feature corresponding to each of the attribute nodes, the second feature corresponding to each of the first connecting lines, the third feature corresponding to each of the attribute value nodes, and the fourth feature corresponding to each of the second connecting lines.

Optionally, the apparatus may further comprise a model training module 503 configured to:

Obtain a plurality of target image samples, the plurality of target image samples comprises labelled data of a text coverage region, labelled data of a text center region, labelled data of an attribute data region, labelled data of an attribute value data region, and labelled data of a matching relationship between attribute data and attribute value data;

Input each of the target image samples into a predetermined initial network model comprising a first initial subnetwork and a second initial subnetwork;

Obtain, by the first initial subnetwork, a text coverage region sample, a text center region sample, an attribute data region sample and an attribute value data region sample in the target image sample; determining a target attribute data region sample based on the text coverage region sample, the text center region sample, and the attribute data region sample; and determining a target attribute value data region sample based on the text coverage region sample, the text center region sample, and the attribute value data region sample; and inputting the target attribute data region sample and the target attribute value data region sample into the second initial subnetwork;

Establish, by the second initial subnetwork, a first relationship graph sample corresponding to the target image sample based on the target attribute data region sample, and establishing a second relationship graph sample corresponding to the target image sample based on the target attribute value data region sample, wherein the first relationship graph sample comprises attribute node samples each corresponding to a target attribute data region sample and first connecting line samples between the different attribute node samples, the second relationship graph sample comprises attribute value node samples each corresponding to a target attribute value data region sample and second connecting lines sample between the different attribute value node samples; and obtaining first sample features corresponding to the attribute node samples, second sample features corresponding to the first connecting line samples, third sample features corresponding to the attribute value node samples, and fourth sample features corresponding to the second connecting line sample; and Calculate, in a predetermined loss function, a loss value corresponding to a distance vector between each attribute node sample and an attribute value node sample to be matched based on the first sample features, the second sample features, the third sample features, and the fourth sample features, and based on the labelled data in the target image sample; and iteratively training the predetermined initial network model based on the loss value, to obtain the predetermined graph matching model.

Optionally, the predetermined initial network further comprises a third initial subnetwork, the third initial subnetwork is coupled with the first initial subnetwork and the second initial subnetwork.

The third initial subnetwork is configured to obtain a first sample feature map, a second sample feature map, and a third sample feature map corresponding to the target image sample, wherein a network depth corresponding to the second sample feature map is shallower than a network depth corresponding to the third sample feature map; and input the first sample feature map into the first initial subnetwork and input the second sample feature map and the third sample feature map into the second initial subnetwork;

Accordingly, the model training module is configured to:

Extract, by the second initial subnetwork, a first sample feature corresponding to each of the attribute node samples in the first relationship graph sample and a third sample feature corresponding to each of the attribute value node samples in the second relationship graph sample from a second sample feature map based on the target image sample; and extracting second sample features corresponding to the first connecting line samples and fourth sample features corresponding to the second connecting line samples from the third sample feature map corresponding to the target image sample.

With the above technical solution, not only an end-to-end network model is provided for key-value matching, effectively improving the efficiency of key-value matching, feature data can also be provided by the feature extraction submodel for the semantic segmentation submodel and the image matching submodel simultaneously, thereby the structure of the model can be effectively simplified, the volume of the model itself can be reduced, and the model processing efficiency can be improved. The target attribute value data region and the target attribute data region of higher accuracy are obtained by the semantic segmentation submodel in the predetermined key-value matching model; and then, the matching relationship between the attribute data and the attribute value data in the image to be detected is determined by the image matching submodel based on the target attribute data region and the target attribute value data region, so that the accuracy of key-value matching results can be improved effectively.

Figure 6:
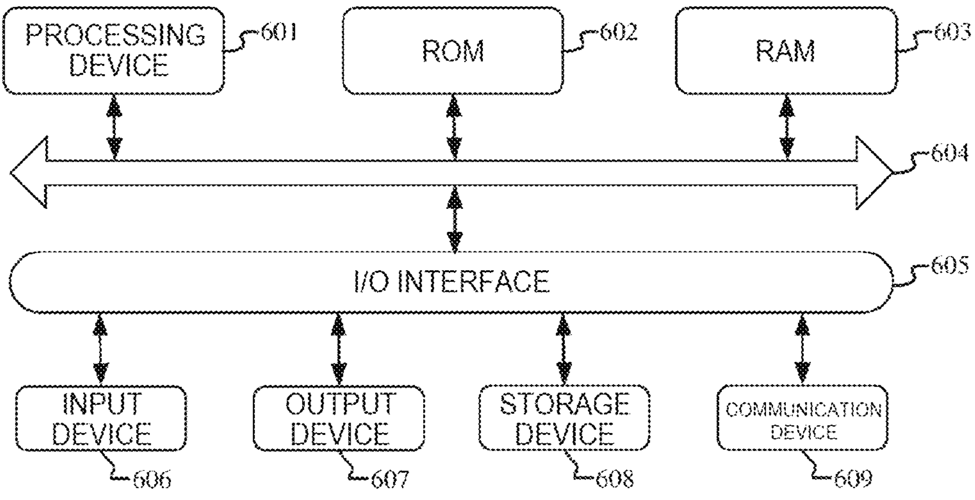
FIG. 6 is a block diagram of an electronic device shown by one exemplary embodiments of the present disclosure.

Refer to FIG. 6 in the following, which shows a schematic diagram of an electronic device (a terminal device or a server) 600 according to an embodiment of the present disclosure, Terminal devices in the embodiments of this application may include, but are not limited to, mobile phones, notebook computers, digital broadcast receivers, PDA (Personal Digital Assistant, personal digital assistant), PAD (tablet computer). PMP (Portable Media Player, portable multimedia players), vehicle-mounted terminals (such as vehicle-mounted navigation terminals), etc., as well as fixed terminals such as digital TV (television, television), desktop computers, etc. The electronic device shown in FIG. 6 is only an example, and should not limit the function and application range of the embodiments of the present disclosure.

As shown in FIG. 6, the electronic device 600 may include a processing device (such as a central processing unit, a graphics processing unit, or the like) 601 that may perform various appropriate actions and processing according to a program stored in a read-only memory (ROM) 602 or a program loaded from a storage device 608 into a random-access memory (RAM) 603. In the RAM 603, various programs and data required for operation of the electronic device 600 are further stored. The processing device 601, the ROM 602, and the RAM 603 are connected to each other by using a bus 604. An input/output (I/O) interface 605 is also connected to the bus 604.

Generally, the following devices may be connected to the I/O interface 605: input device 606 including, for example, a touchscreen, a touchpad, a keyboard, a mouse, a camera, a microphone, an accelerometer, and a gyroscope; output device 607 including, for example, a liquid crystal display (LCD), a loudspeaker and a vibrator; storage device 608 including, for example, a tape or a hard disk; and a communications device 609. The communications device 609 may allow the electronic device 600 to communicate wirelessly or wiredly with another device to exchange data. Although FIG. 6 shows an electronic device 600 with various devices, it should be understood that it is not required to implement or provide all shown devices. Alternatively, more or fewer devices may be implemented or provided.

In particular, according to the embodiments of the present disclosure, the process described above with reference to the flowchart may be implemented as a computer software program. For example, an embodiment of the present disclosure includes a computer software program product that includes a computer program carried on a readable medium, and the computer program includes program codes used to perform the methods shown in the flowchart. In such an embodiment, the computer program may be downloaded and installed from a network by using the communications device 609, or installed from the storage device 608, or installed from the ROM 602. When the computer program is executed by the processing device 601, the foregoing functions defined in the method in the embodiments of the present disclosure are executed.

It should be noted that the foregoing computer-readable medium in the present disclosure may be a computer-readable signal medium, a computer-readable storage medium, or any combination of the two. The computer-readable storage medium may be, for example, an electrical, magnetic, optical, electromagnetic, infrared, or semiconductor system, apparatus, or means, or any combination thereof. More specific examples of the computer-readable storage medium may include but are not limited to: an electrical connection having one or more conducting wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that includes or stores a program, and the program may be used by or in combination with an instruction execution system, apparatus, or means. In addition, in the present disclosure, the computer-readable signal medium may include a data signal propagated in a baseband or as a part of a carrier, which carries computer-readable program codes. Such a propagated data signal may be in multiple forms, including but not limited to an electromagnetic signal, an optical signal, or any suitable combination thereof. The computer-readable signal medium may further be any computer-readable medium other than the computer-readable storage medium, and the computer-readable signal medium may send, propagate, or transmit a program that is used by or in combination with an instruction execution system, apparatus, or means. The program code included in the computer-readable medium may be transmitted by using any suitable medium, including but not limited to: a wire, an optical cable. RF (radio frequency), or any suitable combination thereof.

In some embodiments, the client and the server can communicate by using any currently known or future-developed network protocol, for example, an HTTP (Hyper Text Transfer Protocol), and can be interconnected by a communication network of any form or any medium. Examples of the communication network include a local area network ("LAN"), a wide area network ("WAN"), an internet network (for example, the Internet), and an end-to-end network (for example, an ad hoc end-to-end network), and any currently known or future-developed network.

The foregoing computer-readable medium may be included in the foregoing electronic device; it may also exist separately without being assembled into the electronic device.

The foregoing computer-readable medium carries one or more programs, when the foregoing one or more programs are executed by the electronic device, causing the electronic device; obtaining an image to be detected, the image to be detected comprising at least one attribute data and at least one attribute value data: inputting the image to be detected into a predetermined key-value matching model, to cause the predetermined key-value matching model to output a matching relationship between the attribute data and the attribute value data; wherein the predetermined key-value matching model comprises a semantic segmentation submodel and an image matching submodel coupled with the semantic segmentation submodel: the semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region; and the image matching submodel is configured to determine the matching relationship between the attribute data and the attribute value data in the image to be detected based on the target attribute data region and the target attribute value data region.

Computer program codes for performing the operations of the present disclosure may be written in one or more programming languages or a combination thereof, such as object-oriented programming languages Java, Smalltalk, C++, and conventional procedural programming languages such as "C" or similar program design languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order than those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The modules described in embodiments of the present disclosure may be implemented either by means of software or by means of hardware. Where, the names of these units do not limit the units themselves under certain circumstances, for example, an obtaining module can be described as "obtaining an image to be detected, the image to be detected comprising at least one attribute data and at least one attribute value data".

The functions described above herein may be performed, at least in part, by one or more hardware logic components. For example, and without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs). Complex Programmable Logical device (CPLD) and so on.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, apparatus or device, or any suitable combination of the foregoing. More specific examples of machine-readable storage media would include one or more wire-based electrical connection, portable computer disks, hard disks, random access memory (RAM), read only memory (ROM), erasable programmable read only memory (EPROM or flash memory), optical fiber, portable compact disk read-only memory (CD-ROM), optical storage device, magnetic storage device, or any suitable combination of the foregoing content.

According to one or more embodiments of the present disclosure, a method of key-value matching is provided by example 1, the method further comprises:

Obtaining an image to be detected, the image to be detected comprising at least one attribute data and at least one attribute value data;

Inputting the image to be detected into a predetermined key-value matching model, to cause the predetermined key-value matching model to output a matching relationship between the attribute data and the attribute value data;

Wherein the predetermined key-value matching model comprises a semantic segmentation submodel and an image matching submodel coupled with the semantic segmentation submodel;

The semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region;

The image matching submodel is configured to determine the matching relationship between the attribute data and the attribute value data in the image to be detected based on the target attribute data region and the target attribute value data region.

According to one or more embodiments of the present disclosure, a method of example 1 is provided by example 2, the semantic segmentation submodel is configured to: Scale up the text center region proportionally by a predetermined factor to obtain a scaled-up target text center region, obtain a first intersection region of the target text center region and the text coverage region, and obtain a second intersection region of the first intersection region and the attribute data region, use the second intersection region as the target attribute data region, and obtain a third intersection region of the first intersection region and the attribute value data region, use the third intersection region as the target attribute value data region.

According to one or more embodiments of the present disclosure, a method of example 1 is provided by example 3, wherein the image matching submodel is configured tol Establish a first relationship graph based on the target attribute data region, establish a second relationship graph based on the target attribute value data region, and determine a matching relationship between the attribute data and the attribute value data in the image to be detected based on the first relationship graph and the second relationship graph;

Wherein the first relationship graph comprises attribute nodes each corresponding to a target attribute data region and first connecting lines between the different attribute nodes, and the second relationship graph comprises attribute value nodes each corresponding to a target attribute value data region and second connecting lines between the different attribute value nodes.

According to one or more embodiments of the present disclosure, a method of example 3 is provided by example 4, the predetermined key-value matching model further comprises a feature extraction submodel coupled with the semantic segmentation submodel and the graph matching submodel, respectively;

The feature extraction submodel is configured to obtain a first feature map corresponding to the image to be detected through down sampling, and input the first feature map into the semantic segmentation submodel, to cause the semantic segmentation submodel to determine, based on the first feature map, the text coverage region, the text center region, the attribute data region, and the attribute value data region in the image to be detected; and The feature extraction submodel is further configured to obtain a second feature map and a third feature map corresponding to the image to be detected, and input the second feature map and the third feature map into the graph matching submodel, to cause the image matching submodel to determine a matching relationship between the attribute data and the attribute value data in the image to be detected based on the second feature map, the third feature map, the first relationship graph, and the second relationship graph, wherein a network depth corresponding to the second feature map is shallower than a network depth corresponding to the third feature map.

According to one or more embodiments of the present disclosure, a method of example 2 is provided by example 5, the image matching submodel is configured to:

Extract, from the second feature map, a first feature corresponding to each of the attribute nodes in the first relationship graph; extract, from the third feature map, a second feature corresponding to each of the first connecting lines; extract, from the second feature map, a third feature corresponding to each of the attribute values node in the second relationship graph; and extract, from the third feature map, a fourth feature corresponding to each of the second connecting lines; and determine a matching relationship between the attribute data and the attribute value data based on the first feature corresponding to each of the attribute nodes, the second feature corresponding to each of the first connecting lines, the third feature corresponding to each of the attribute value nodes, and the fourth feature corresponding to each of the second connecting lines.

According to one or more embodiments of the present disclosure, a method of any of example 1-5 is provided by example 6, the predetermined key-value matching model is trained by the following ways:

Obtaining a plurality of target image samples, the plurality of target image samples comprises labelled data of a text coverage region, labelled data of a text center region, labelled data of an attribute data region, labelled data of an attribute value data region, and labelled data of a matching relationship between attribute data and attribute value data;

Inputting each of the target image samples into a predetermined initial network model comprising a first initial subnetwork and a second initial subnetwork;

Obtaining, by the first initial subnetwork, a text coverage region sample, a text center region sample, an attribute data region sample and an attribute value data region sample in the target image sample; determining a target attribute data region sample based on the text coverage region sample, the text center region sample, and the attribute data region sample; and determining a target attribute value data region sample based on the text coverage region sample, the text center region sample, and the attribute value data region sample; and inputting the target attribute data region sample and the target attribute value data region sample into the second initial subnetwork;

Establishing, by the second initial subnetwork, a first relationship graph sample corresponding to the target image sample based on the target attribute data region sample, and establishing a second relationship graph sample corresponding to the target image sample based on the target attribute value data region sample, wherein the first relationship graph sample comprises attribute node samples each corresponding to a target attribute data region sample and first connecting line samples between the different attribute node samples, the second relationship graph sample comprises attribute value node samples each corresponding to a target attribute value data region sample and second connecting lines sample between the different attribute value node samples; and obtaining first sample features corresponding to the attribute node samples, second sample features corresponding to the first connecting line samples, third sample features corresponding to the attribute value node samples, and fourth sample features corresponding to the second connecting line sample;

Calculating, in a predetermined loss function, a loss value corresponding to a distance vector between each attribute node sample and an attribute value node sample to be matched based on the first sample features, the second sample features, the third sample features, and the fourth sample features, and based on the labelled data in the target image sample; and iteratively training the predetermined initial network model based on the loss value, to obtain the predetermined graph matching model.

According to one or more embodiments of the present disclosure, a method of example 6 is provided by example 7, the predetermined initial network further comprises a third initial subnetwork coupled with the first initial subnetwork and the second initial subnetwork.

The third initial subnetwork is configured to obtain a first sample feature map, a second sample feature map, and a third sample feature map corresponding to the target image sample, wherein a network depth corresponding to the second sample feature map is shallower than a network depth corresponding to the third sample feature map; and input the first sample feature map into the first initial subnetwork and input the second sample feature map and the third sample feature map into the second initial subnetwork; and Accordingly, obtaining first sample features corresponding to the attribute node samples, second sample features corresponding to the first connecting line samples, third sample features corresponding to the attribute value node samples and fourth sample features corresponding to the second connecting line samples comprises:

Extracting, by the second initial subnetwork, a first sample feature corresponding to each of the attribute node samples in the first relationship graph sample and a third sample feature corresponding to each of the attribute value node samples in the second relationship graph sample from a second sample feature map based on the target image sample: and extracting second sample features corresponding to the first connecting line samples and fourth sample features corresponding to the second connecting line samples from the third sample feature map corresponding to the target image sample.

According to one or more embodiments of the present disclosure, an apparatus for key-value matching is provided by example 8, the apparatus comprises:

An obtaining module configured to obtain an image to be detected, the image to be detected comprising comprises at least one attribute data and at least one attribute value data; and A determination module configured to input the image to be detected into a predetermined key-value matching model, to cause the predetermined key-value matching model to output a matching relationship between the attribute data and the attribute value data;

Wherein the predetermined key-value matching model comprises a semantic segmentation submodel and an image matching submodel coupled with the semantic segmentation submodel;

The semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region; and The image matching submodel is configured to determine the matching relationship between the attribute data and the attribute value data in the image to be detected based on the target attribute data region and the target attribute value data region.

According to one or more embodiments of the present disclosure, a computer-readable medium having a computer program stored thereon is provided by example 9, the program, when executed by a processing apparatus, implementing the steps of the method of any of examples 1-7.

According to one or more embodiments of the present disclosure, an electronic device is provided by example 10, comprising:

A storage apparatus having a computer program stored thereon; and

A processing apparatus for executing the computer program in the storage apparatus to implement the steps of the method of any of example 1-7.

The above description is only preferred embodiments of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept, for example, a technical solution formed by interchanging the above features with (but not limited to) technical features with similar functions disclosed in the present disclosure.

Furthermore, although the operations are depicted using a particular order, this should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject has been described using language specific to structural features and/or method logical actions, it should be understood that the subject limited in the appended claims is not necessarily limited to the particular features or actions described above. Rather, the particular features and actions described above are merely example forms of implementing the claims. Regarding the apparatus in the above embodiments, the specific manner in which each module performs operations has been described in detail in the embodiments related to the method, and will not be elaborated here.

What is claimed is:

1. A method of key-value matching, comprising:

obtaining an image to be detected, the image to be detected comprising at least one attribute data and at least one attribute value data; and inputting the image to be detected into a predetermined key-value matching model, to cause the predetermined key-value matching model to output a matching relationship between the attribute data and the attribute value data;

wherein the predetermined key-value matching model comprises a semantic segmentation submodel and an image matching submodel coupled with the semantic segmentation submodel;

wherein the semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region; and wherein the image matching submodel is configured to determine the matching relationship between the attribute data and the attribute value data in the image to be detected based on the target attribute data region and the target attribute value data region.

2. The method of claim 1, wherein the semantic segmentation submodel is configured to:

scale up the text center region proportionally by a predetermined factor to obtain a scaled-up target text center region, obtain a first intersection region of the target text center region and the text coverage region, and obtain a second intersection region of the first intersection region and the attribute data region, use the second intersection region as the target attribute data region, and obtain a third intersection region of the first intersection region and the attribute value data region, use the third intersection region as the target attribute value data region.

3. The method of claim 1, wherein the image matching submodel is configured to:

establish a first relationship graph based on the target attribute data region, establish a second relationship graph based on the target attribute value data region, and determine the matching relationship between the attribute data and the attribute value data in the image to be detected based on the first relationship graph and the second relationship graph;

wherein the first relationship graph comprises attribute nodes each corresponding to the target attribute data region and first connecting lines between the different attribute nodes, and the second relationship graph comprises attribute value nodes each corresponding to the target attribute value data region and second connecting lines between the different attribute value nodes.

4. The method of claim 3, wherein the predetermined key-value matching model further comprises a feature extraction submodel coupled with the semantic segmentation submodel and the image matching submodel, respectively;

wherein the feature extraction submodel is configured to obtain a first feature map corresponding to the image to be detected through down sampling, and input the first feature map into the semantic segmentation submodel, to cause the semantic segmentation submodel to determine, based on the first feature map, the text coverage region, the text center region, the attribute data region, and the attribute value data region in the image to be detected feature map; and wherein the feature extraction submodel is further configured to obtain a second feature map and a third feature map corresponding to the image to be detected, and input the second feature map and the third feature map into the image matching submodel, to cause the image matching submodel to determine the matching relationship between the attribute data and the attribute value data in the image to be detected based on the second feature map, the third feature map, the first relationship graph, and the second relationship graph, wherein a network depth corresponding to the second feature map is shallower than a network depth corresponding to the third feature map.

5. The method of claim 4, wherein the image matching submodel is configured to:

extract, from the second feature map, a first feature corresponding to each of the attribute nodes in the first relationship graph feature map; extract, from the third feature map, a second feature corresponding to each of the first connecting lines feature map; extract, from the second feature map, a third feature corresponding to each of the attribute values node in the second relationship graph feature map; and extract, from the third feature map, a fourth feature corresponding to each of the second connecting lines feature map; and determine the matching relationship between the attribute data and the attribute value data based on the first feature corresponding to each of the attribute nodes, the second feature corresponding to each of the first connecting lines, the third feature corresponding to each of the attribute value nodes, and the fourth feature corresponding to each of the second connecting lines.

6. The method of claim 1, wherein the predetermined key-value matching model is trained by:

obtaining a plurality of target image samples, the plurality of target image samples comprises labelled data of the text coverage region, labelled data of the text center region, labelled data of the attribute data region, labelled data of the attribute value data region, and labelled data of the matching relationship between attribute data and attribute value data;

inputting each of the target image samples into a predetermined initial network model comprising a first initial subnetwork and a second initial subnetwork;

obtaining, by the first initial subnetwork, a text coverage region sample, a text center region sample, an attribute data region sample and an attribute value data region sample in the target image sample; determining a target attribute data region sample based on the text coverage region sample, the text center region sample, and the attribute data region sample; and determining a target attribute value data region sample based on the text coverage region sample, the text center region sample, and the attribute value data region sample; and inputting the target attribute data region sample and the target attribute value data region sample into the second initial subnetwork;

establishing, by the second initial subnetwork, a first relationship graph sample corresponding to the target image sample based on the target attribute data region sample, and establishing a second relationship graph sample corresponding to the target image sample based on the target attribute value data region sample, wherein the first relationship graph sample comprises attribute node samples each corresponding to a target attribute data region sample and first connecting line samples between the different attribute node samples, the second relationship graph sample comprises attribute value node samples each corresponding to a target attribute value data region sample and second connecting lines sample between the different attribute value node samples; and obtaining first sample features corresponding to the attribute node samples, second sample features corresponding to the first connecting line samples, third sample features corresponding to the attribute value node samples, and fourth sample features corresponding to the second connecting line sample; and calculating, in a predetermined loss function, a loss value corresponding to a distance vector between each attribute node sample and an attribute value node sample to be matched based on the first sample features, the second sample features, the third sample features, and the fourth sample features, and based on the labelled data in the target image sample; and iteratively training the predetermined initial network model based on the loss value, to obtain the predetermined image matching model.

7. The method of claim 6, wherein the predetermined initial network further comprises a third initial subnetwork coupled with the first initial subnetwork and the second initial subnetwork;

wherein the third initial subnetwork is configured to obtain a first sample feature map, a second sample feature map, and a third sample feature map corresponding to the target image sample, wherein a network depth corresponding to the second sample feature map is shallower than a network depth corresponding to the third sample feature map; and input the first sample feature map into the first initial subnetwork and input the second sample feature map and the third sample feature map into the second initial subnetwork; and wherein obtaining first sample features corresponding to the attribute node samples, second sample features corresponding to the first connecting line samples, third sample features corresponding to the attribute value node samples and fourth sample features corresponding to the second connecting line samples comprises:

extracting, by the second initial subnetwork, a first sample feature corresponding to each of the attribute node samples in the first relationship graph sample and a third sample feature corresponding to each of the attribute value node samples in the second relationship graph sample from a second sample feature map based on the target image sample; and extracting second sample features corresponding to the first connecting line samples and fourth sample features corresponding to the second connecting line samples from the third sample feature map corresponding to the target image sample.

8. A non-transitory computer-readable medium having a computer program stored thereon, the program, when executed by a processing apparatus, implementing acts comprising:

obtaining an image to be detected, the image to be detected comprising at least one attribute data and at least one attribute value data; and inputting the image to be detected into a predetermined key-value matching model, to cause the predetermined key-value matching model to output a matching relationship between the attribute data and the attribute value data;

wherein the predetermined key-value matching model comprises a semantic segmentation submodel and an image matching submodel coupled with the semantic segmentation submodel;

wherein the semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region; and wherein the image matching submodel is configured to determine the matching relationship between the attribute data and the attribute value data in the image to be detected based on the target attribute data region and the target attribute value data region.

9. The non-transitory computer-readable storage medium of claim 8, wherein the semantic segmentation submodel is configured to:

scale up the text center region proportionally by a predetermined factor to obtain a scaled-up target text center region, obtain a first intersection region of the target text center region and the text coverage region, and obtain a second intersection region of the first intersection region and the attribute data region, use the second intersection region as the target attribute data region, and obtain a third intersection region of the first intersection region and the attribute value data region, use the third intersection region as the target attribute value data region.

10. The non-transitory computer-readable storage medium of claim 8, wherein the image matching submodel is configured to:

establish a first relationship graph based on the target attribute data region, establish a second relationship graph based on the target attribute value data region, and determine the matching relationship between the attribute data and the attribute value data in the image to be detected based on the first relationship graph and the second relationship graph;

wherein the first relationship graph comprises attribute nodes each corresponding to the target attribute data region and first connecting lines between the different attribute nodes, and the second relationship graph comprises attribute value nodes each corresponding to the target attribute value data region and second connecting lines between the different attribute value nodes.

11. The non-transitory computer-readable storage medium of claim 10, wherein the predetermined key-value matching model further comprises a feature extraction submodel coupled with the semantic segmentation submodel and the image matching submodel, respectively;

wherein the feature extraction submodel is configured to obtain a first feature map corresponding to the image to be detected through down sampling, and input the first feature map into the semantic segmentation submodel, to cause the semantic segmentation submodel to determine, based on the first feature map, the text coverage region, the text center region, the attribute data region, and the attribute value data region in the image to be detected feature map; and wherein the feature extraction submodel is further configured to obtain a second feature map and a third feature map corresponding to the image to be detected, and input the second feature map and the third feature map into the image matching submodel, to cause the image matching submodel to determine the matching relationship between the attribute data and the attribute value data in the image to be detected based on the second feature map, the third feature map, the first relationship graph, and the second relationship graph, wherein a network depth corresponding to the second feature map is shallower than a network depth corresponding to the third feature map.

12. The non-transitory computer-readable storage medium of claim 11, wherein the image matching submodel is configured to:

extract, from the second feature map, a first feature corresponding to each of the attribute nodes in the first relationship graph feature map; extract, from the third feature map, a second feature corresponding to each of the first connecting lines feature map; extract, from the second feature map, a third feature corresponding to each of the attribute values node in the second relationship graph feature map; and extract, from the third feature map, a fourth feature corresponding to each of the second connecting lines feature map; and determine the matching relationship between the attribute data and the attribute value data based on the first feature corresponding to each of the attribute nodes, the second feature corresponding to each of the first connecting lines, the third feature corresponding to each of the attribute value nodes, and the fourth feature corresponding to each of the second connecting lines.

13. The non-transitory computer-readable storage medium of claim 8, wherein the predetermined key-value matching model is trained by:

obtaining a plurality of target image samples, the plurality of target image samples comprises labelled data of the text coverage region, labelled data of the text center region, labelled data of the attribute data region, labelled data of the attribute value data region, and labelled data of the matching relationship between attribute data and attribute value data;

inputting each of the target image samples into a predetermined initial network model comprising a first initial subnetwork and a second initial subnetwork;

obtaining, by the first initial subnetwork, a text coverage region sample, a text center region sample, an attribute data region sample and an attribute value data region sample in the target image sample; determining a target attribute data region sample based on the text coverage region sample, the text center region sample, and the attribute data region sample; and determining a target attribute value data region sample based on the text coverage region sample, the text center region sample, and the attribute value data region sample; and inputting the target attribute data region sample and the target attribute value data region sample into the second initial subnetwork;

establishing, by the second initial subnetwork, a first relationship graph sample corresponding to the target image sample based on the target attribute data region sample, and establishing a second relationship graph sample corresponding to the target image sample based on the target attribute value data region sample, wherein the first relationship graph sample comprises attribute node samples each corresponding to a target attribute data region sample and first connecting line samples between the different attribute node samples, the second relationship graph sample comprises attribute value node samples each corresponding to a target attribute value data region sample and second connecting lines sample between the different attribute value node samples; and obtaining first sample features corresponding to the attribute node samples, second sample features corresponding to the first connecting line samples, third sample features corresponding to the attribute value node samples, and fourth sample features corresponding to the second connecting line sample; and calculating, in a predetermined loss function, a loss value corresponding to a distance vector between each attribute node sample and an attribute value node sample to be matched based on the first sample features, the second sample features, the third sample features, and the fourth sample features, and based on the labelled data in the target image sample; and iteratively training the predetermined initial network model based on the loss value, to obtain the predetermined image matching model.

14. The non-transitory computer-readable storage medium of claim 13, wherein the predetermined initial network further comprises a third initial subnetwork coupled with the first initial subnetwork and the second initial subnetwork;

wherein the third initial subnetwork is configured to obtain a first sample feature map, a second sample feature map, and a third sample feature map corresponding to the target image sample, wherein a network depth corresponding to the second sample feature map is shallower than a network depth corresponding to the third sample feature map; and input the first sample feature map into the first initial subnetwork and input the second sample feature map and the third sample feature map into the second initial subnetwork; and wherein obtaining first sample features corresponding to the attribute node samples, second sample features corresponding to the first connecting line samples, third sample features corresponding to the attribute value node samples and fourth sample features corresponding to the second connecting line samples comprises:

extracting, by the second initial subnetwork, a first sample feature corresponding to each of the attribute node samples in the first relationship graph sample and a third sample feature corresponding to each of the attribute value node samples in the second relationship graph sample from a second sample feature map based on the target image sample; and extracting second sample features corresponding to the first connecting line samples and fourth sample features corresponding to the second connecting line samples from the third sample feature map corresponding to the target image sample.

15. An electronic device, comprising:

a storage apparatus having a computer program stored thereon; and a processing apparatus for executing the computer program in the storage apparatus to implement acts comprising:

obtaining an image to be detected, the image to be detected comprising at least one attribute data and at least one attribute value data; and inputting the image to be detected into a predetermined key-value matching model, to cause the predetermined key-value matching model to output a matching relationship between the attribute data and the attribute value data;

wherein the predetermined key-value matching model comprises a semantic segmentation submodel and an image matching submodel coupled with the semantic segmentation submodel;

wherein the semantic segmentation submodel is configured to obtain a text coverage region, a text center region, an attribute data region, and an attribute value data region in the image to be detected, determine a target attribute data region based on the text coverage region, the text center region, and the attribute data region, and determine a target attribute value data region based on the text coverage region, the text center region, and the attribute value data region; and wherein the image matching submodel is configured to determine the matching relationship between the attribute data and the attribute value data in the image to be detected based on the target attribute data region and the target attribute value data region.

16. The device of claim 15, wherein the semantic segmentation submodel is configured to:

scale up the text center region proportionally by a predetermined factor to obtain a scaled-up target text center region, obtain a first intersection region of the target text center region and the text coverage region, and obtain a second intersection region of the first intersection region and the attribute data region, use the second intersection region as the target attribute data region, and obtain a third intersection region of the first intersection region and the attribute value data region, use the third intersection region as the target attribute value data region.

17. The device of claim 15, wherein the image matching submodel is configured to:

establish a first relationship graph based on the target attribute data region, establish a second relationship graph based on the target attribute value data region, and determine the matching relationship between the attribute data and the attribute value data in the image to be detected based on the first relationship graph and the second relationship graph;

wherein the first relationship graph comprises attribute nodes each corresponding to the target attribute data region and first connecting lines between the different attribute nodes, and the second relationship graph comprises attribute value nodes each corresponding to the target attribute value data region and second connecting lines between the different attribute value nodes.

18. The device of claim 17, wherein the predetermined key-value matching model further comprises a feature extraction submodel coupled with the semantic segmentation submodel and the image matching submodel, respectively;

wherein the feature extraction submodel is configured to obtain a first feature map corresponding to the image to be detected through down sampling, and input the first feature map into the semantic segmentation submodel, to cause the semantic segmentation submodel to determine, based on the first feature map, the text coverage region, the text center region, the attribute data region, and the attribute value data region in the image to be detected feature map; and wherein the feature extraction submodel is further configured to obtain a second feature map and a third feature map corresponding to the image to be detected, and input the second feature map and the third feature map into the image matching submodel, to cause the image matching submodel to determine the matching relationship between the attribute data and the attribute value data in the image to be detected based on the second feature map, the third feature map, the first relationship graph, and the second relationship graph, wherein a network depth corresponding to the second feature map is shallower than a network depth corresponding to the third feature map.

19. The device of claim 18, wherein the image matching submodel is configured to:

extract, from the second feature map, a first feature corresponding to each of the attribute nodes in the first relationship graph feature map; extract, from the third feature map, a second feature corresponding to each of the first connecting lines feature map; extract, from the second feature map, a third feature corresponding to each of the attribute values node in the second relationship graph feature map; and extract, from the third feature map, a fourth feature corresponding to each of the second connecting lines feature map; and determine the matching relationship between the attribute data and the attribute value data based on the first feature corresponding to each of the attribute nodes, the second feature corresponding to each of the first connecting lines, the third feature corresponding to each of the attribute value nodes, and the fourth feature corresponding to each of the second connecting lines.

20. The device of claim 15, wherein the predetermined key-value matching model is trained by:

obtaining a plurality of target image samples, the plurality of target image samples comprises labelled data of the text coverage region, labelled data of the text center region, labelled data of the attribute data region, labelled data of the attribute value data region, and labelled data of the matching relationship between attribute data and attribute value data;

inputting each of the target image samples into a predetermined initial network model comprising a first initial subnetwork and a second initial subnetwork;

obtaining, by the first initial subnetwork, a text coverage region sample, a text center region sample, an attribute data region sample and an attribute value data region sample in the target image sample; determining a target attribute data region sample based on the text coverage region sample, the text center region sample, and the attribute data region sample; and determining a target attribute value data region sample based on the text coverage region sample, the text center region sample, and the attribute value data region sample; and inputting the target attribute data region sample and the target attribute value data region sample into the second initial subnetwork;

establishing, by the second initial subnetwork, a first relationship graph sample corresponding to the target image sample based on the target attribute data region sample, and establishing a second relationship graph sample corresponding to the target image sample based on the target attribute value data region sample, wherein the first relationship graph sample comprises attribute node samples each corresponding to a target attribute data region sample and first connecting line samples between the different attribute node samples, the second relationship graph sample comprises attribute value node samples each corresponding to a target attribute value data region sample and second connecting lines sample between the different attribute value node samples; and obtaining first sample features corresponding to the attribute node samples, second sample features corresponding to the first connecting line samples, third sample features corresponding to the attribute value node samples, and fourth sample features corresponding to the second connecting line sample; and calculating, in a predetermined loss function, a loss value corresponding to a distance vector between each attribute node sample and an attribute value node sample to be matched based on the first sample features, the second sample features, the third sample features, and the fourth sample features, and based on the labelled data in the target image sample; and iteratively training the predetermined initial network model based on the loss value, to obtain the predetermined image matching model.

* * * * *